United States Patent
Krishnamoorthy et al.

(10) Patent No.: US 9,348,593 B2
(45) Date of Patent: May 24, 2016

(54) INSTRUCTION ADDRESS ENCODING AND DECODING BASED ON PROGRAM CONSTRUCT GROUPS

(75) Inventors: Prakash Krishnamoorthy, Bethlehem, PA (US); Ramesh C. Tekumalla, Breinisgsville, PA (US); Parag Madhani, Allentown, PA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 839 days.

(21) Appl. No.: 13/596,381

(22) Filed: Aug. 28, 2012

(65) Prior Publication Data

US 2014/0068229 A1    Mar. 6, 2014

(51) Int. Cl.
G06F 9/30 (2006.01)
G06F 9/32 (2006.01)
G06F 9/34 (2006.01)
G06F 9/38 (2006.01)

(52) U.S. Cl.
CPC ........ *G06F 9/30181* (2013.01); *G06F 9/30156* (2013.01); *G06F 9/32* (2013.01); *G06F 9/322* (2013.01); *G06F 9/34* (2013.01); *G06F 9/3806* (2013.01)

(58) Field of Classification Search
CPC .............. G06F 9/30145; G06F 9/3017; G06F 9/30167; G06F 9/30181; G06F 9/3836; G06F 9/30156; G06F 9/32; G06F 9/322; G06F 9/34; G06F 9/3806; G06F 9/30
See application file for complete search history.

(56) References Cited

U.S. PATENT DOCUMENTS

| | | | | |
|---|---|---|---|---|
| 6,012,134 | A * | 1/2000 | McInerney et al. | 711/207 |
| 6,347,383 | B1 | 2/2002 | Elnozahy | |
| 6,449,714 | B1 * | 9/2002 | Sinharoy | 712/240 |
| 6,643,769 | B1 * | 11/2003 | Huck et al. | 712/227 |
| 7,496,902 | B2 | 2/2009 | Levine et al. | |
| 2002/0138700 | A1 * | 9/2002 | Holmberg | 711/137 |
| 2003/0101326 | A1 | 5/2003 | Falah et al. | |
| 2003/0212879 | A1 | 11/2003 | Henkel et al. | |
| 2006/0212761 | A1 * | 9/2006 | Levine et al. | 714/45 |
| 2007/0226724 | A1 * | 9/2007 | Huang | 717/162 |
| 2012/0005463 | A1 | 1/2012 | Mestan et al. | |

OTHER PUBLICATIONS

Y. Aghaghiri et al., "BEAM: Bus Encoding Based on Instruction-Set-Aware Memories," Asia and South Pacific Design Automation Conference (ASP-DAC), Jan. 2003, pp. 3-8.

(Continued)

*Primary Examiner* — Farley Abad

(57) ABSTRACT

Coding circuitry comprises at least an encoder configured to encode an instruction address for transmission to a decoder. The encoder is operative to identify the instruction address as belonging to a particular one of a plurality of groups of instruction addresses associated with respective distinct program constructs, and to encode the instruction address based on the identified group. The decoder is operative to identify the encoded instruction address as belonging to the particular one of a plurality of groups of instruction addresses associated with respective distinct program constructs, and to decode the encoded instruction address based on the identified group. The coding circuitry may be implemented as part of an integrated circuit or other processing device that includes associated processor and memory elements. In such an arrangement, the processor may generate the instruction address for delivery over a bus to the memory.

20 Claims, 12 Drawing Sheets

(56) References Cited

OTHER PUBLICATIONS

D.C. Suresh et al., "A Tunable Bus Encoder for Off-Chip Data Buses," International Symposium on Low Power Electronics and Design (ISLPED), Aug. 2005, pp. 319-322.

H. Kaul et al., "Design and Analysis of Spatial Encoding Circuits for Peak Power Reduction in On-Chip Buses," IEEE Transactions on Very Large Scale Integration (VLSI) Systems, Nov. 2005, pp. 1225-1238, vol. 13, No. 11.

C.-G. Lyuh et al., "Low Power Bus Encoding with Crosstalk Delay Elimination [SoC]," 15th Annual IEEE International Application-Specific Integrated Circuit/System on Chip (ASIC/SOC) Conference, Sep. 2002, pp. 389-393.

P. Subrahmanya et al., "A Bus Encoding Technique for Power and Cross-Talk Minimization," 17th International Conference on Very Large Scale Integration (VLSI) Design, with 3rd International Conference on Embedded Systems Design, Jan. 2004, pp. 443-448, Mumbai, India.

T. Austin et al., "SimpleScalar: An Infrastructure for Computer System Modeling," IEEE Computer, Feb. 2002, pp. 59-67, vol. 35, No. 2.

D.C. Suresh et al., "VALVE: Variable Length Value Encoder for Off-Chip Data Buses," IEEE International Conference on Computer Design (ICCD): Very Large Scale Integration (VLSI) in Computers and Processors, Oct. 2005, pp. 631-633.

M.R. Stan et al., "Bus-Invert Coding for Low-Power I/O," IEEE Transactions on Very Large Scale Integration (VLSI) Systems, Mar. 1995, pp. 49-58, vol. 3, No. 1.

J. Yang et al., "FV Encoding for Low-Power Data I/O," IEEE International Symposium on Low Power Electronics and Design (ISLPED), Aug. 2001, pp. 84-87.

M. Mamidipaka et al., "Low Power Address Encoding Using Self-Organizing Lists," IEEE International Symposium on Low Power Electronics and Design (ISLPED), Aug. 2001, pp. 188-193.

L. Benini et al., "Asymptotic Zero-Transition Activity Encoding for Address Busses in Low-Power Microprocessor-Based Systems," IEEE 7th Great Lakes Symposium on Very Large Scale Integration (VLSI), Mar. 1997, pp. 77-82.

W. Fornaciari et al., "Power Optimization of System-Level Address Buses Based on Software Profiling," 8th International Workshop on Hardware/Software Codesign (CODES), May 2000, pp. 29-33.

Y. Aghaghiri et al., "Irredundant Address Bus Encoding for Low Power," IEEE International Symposium on Low Power Electronics and Design (ISLPED), Aug. 2001, pp. 182-187.

L. Benini et al., "Address Bus Encoding Techniques for System-Level Power Optimization," IEEE Design, Automation and Test in Europe, Feb. 1998, pp. 861-866.

E. Musoll et al., "Exploiting the Locality of Memory References to Reduce the Address Bus Energy," IEEE International Symposium on Low Power Electronics and Design (ISLPED), Aug. 1997, pp. 202-207.

E. Musoll et al., "Reducing the Energy of Address and Data Buses with the Working-Zone Encoding Technique and its Effect on Multimedia Applications," Power Driven Microarchitecture Workshop, Jun. 1998, pp. 3-8.

E. Musoll et al., "Working-Zone Encoding for Reducing the Energy in Microprocessor Address Buses," IEEE Transactions on Very Large Scale Integration (VLSI) Systems, Dec. 1998, pp. 568-572, vol. 6, No. 4.

Y. Aghaghiri et al., "Reducing Transitions on Memory Buses Using Sector-Based Encoding Technique," IEEE International Symposium on Low Power Electronics and Design (ISLPED), Aug. 2002, pp. 190-195.

J.L. Hennessy et al., "Computer Architecture: A Quantitative Approach," Morgan Kaufman Publishing Inc., 2nd Edition, 1996, 705 pages.

L. Benini et al., "Power Optimization of Core-Based Systems by Address Bus Encoding," IEEE Transactions on Very Large Scale Integration (VLSI) Systems, Dec. 1998, pp. 554-562, vol. 6, No. 4.

C.S. Ballapuram et al., "Synonymous Address Compaction for Energy Reduction in Data TLB," IEEE International Symposium on Low Power Electronics and Design (ISLPED), Aug. 2005, pp. 357-362.

E.N. Elnozahy, "Address Trace Compression Through Loop Detection and Reduction," ACM Sigmetrics International Conference on Measurement and Modeling of Computer Systems, 1999, 2 pages.

\* cited by examiner

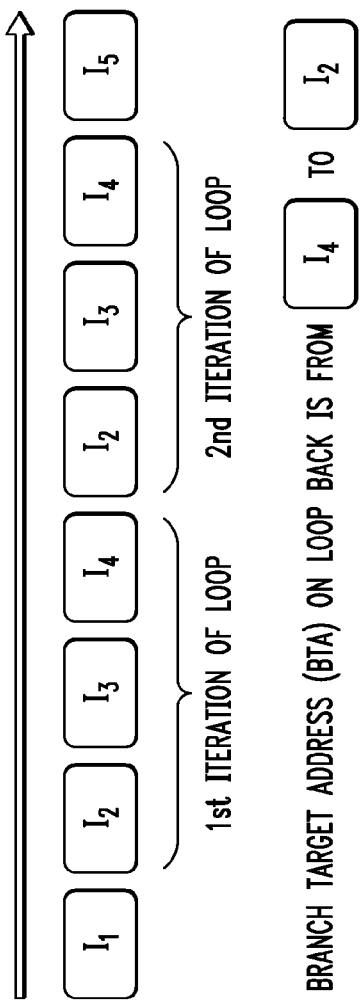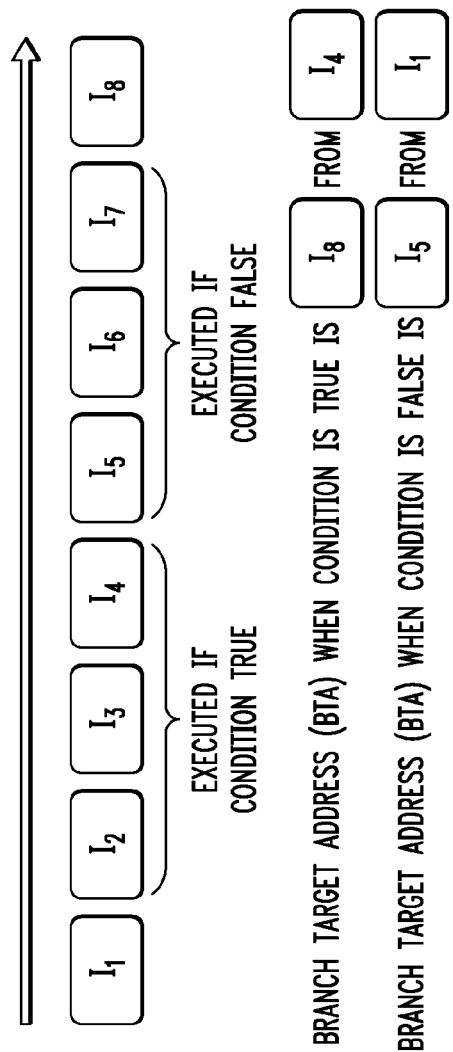

INSTRUCTION ADDRESS ENCODING AND DECODING BASED ON PROGRAM CONSTRUCT GROUPS

BACKGROUND

Processing devices such as computers, servers, mobile telephones, and storage devices typically incorporate one or more buses coupled between a processor and a memory. As is well known, the power consumption in a given such processing device can be heavily influenced by the number and frequency of signal transitions that occur on these buses. For example, in processing devices that include one or more processor core integrated circuits, such as field-programmable gate arrays (FPGAs) or custom application-specific integrated circuits (ASICs), both on-chip and off-chip bus transition activity can represent significant sources of power dissipation.

As one illustrative example of bus transition activity, consider an instruction address bus over which addresses change sequentially from 0 to $2^n-1$. On average, one can expect a significant number of transitions on a bus of this type. However, the number of transitions is even larger if the addresses instead change randomly between 0 and $2^n-1$, rather than sequentially from 0 to $2^n-1$.

Accordingly, a variety of techniques have been developed that attempt to reduce such bus transition activity in order to control the overall power consumption of the processing device. Such techniques include, for example, encoding algorithms such as bus invert algorithms, frequent value codes and self-organizing lists, all of which attempt to exploit weights or other statistical properties of individual samples to be transferred over the bus. The bus invert algorithms typically utilize the binary weight of a given sample to determine if that sample should instead be sent over the bus in complemented form in order to reduce transition activity. Encoding algorithms based on frequent value codes and self-organizing lists are generally configured to determine samples that appear on the bus repeatedly and map those samples to respective code words with lower transition activity.

These and other conventional techniques for reducing bus transition activity can be problematic. For example, although certain of the techniques mentioned above can produce acceptable results in the case of sequential execution, such techniques generally do not perform as well in the presence of particular types of program constructs such as loops, jumps or subroutine calls. Alternative techniques such as work zone encoding (WZE) and dynamic sector encoding (DSE) attempt to address these drawbacks, but unfortunately these techniques can significantly increase encoder and decoder complexity, leading to an undesirable increase in the power consumption of these processing device components, which is contrary to the goal of reducing overall device power consumption.

SUMMARY

One or more illustrative embodiments of the present invention provide significant reductions in bus transition activity relative to conventional arrangements through the use of instruction address encoding and decoding based on program construct groups. Such an approach can be configured to exploit statistics resulting from multiple common program constructs in order to achieve enhanced performance in a wide variety of different types of processing devices. Moreover, this approach can also avoid any substantial increases in the complexity and power consumption of the encoder and decoder within a given processing device.

In one embodiment, coding circuitry comprises at least an encoder configured to encode an instruction address for transmission to a decoder. The encoder is operative to identify the instruction address as belonging to a particular one of a plurality of groups of instruction addresses associated with respective distinct program constructs, and to encode the instruction address based on the identified group.

By way of example, identifying the instruction address as belonging to a particular one of a plurality of groups of instruction addresses associated with respective distinct program constructs may further comprise classifying the instruction address as being one of a sequential address and a non-sequential address. Encoding the instruction address based on the identified group may then comprise, for a given instruction address identified as a non-sequential address, storing a corresponding branch target address in a multi-stage memory bank. In an arrangement of this type, the branch target address is initially placed in a first stage of the multi-stage memory bank upon an initial occurrence of the branch target address. The branch target address is advanced to a subsequent stage of the multi-stage memory bank if the branch target address occurs a threshold number of times. The threshold in some embodiments is greater than two.

The first stage of the multi-stage memory bank may be configured to store at least two branch target addresses, and the subsequent stage may be configured to store a number of branch target addresses that is given by a bus width in bits less the number of branch target addresses that can be stored by the first stage.

The coding circuitry in a given embodiment may comprise the decoder in addition to or in place of the encoder. The decoder is operative to identify the encoded instruction address as belonging to the particular one of a plurality of groups of instruction addresses associated with respective distinct program constructs, and to decode the encoded instruction address based on the identified group.

The coding circuitry may be implemented as part of an integrated circuit or other processing device that includes associated processor and memory elements. In such an arrangement, the processor may generate the instruction address for delivery over a bus to the memory.

Coding circuitry in a given embodiment can be implemented in the form of one or more integrated circuits. For example, such coding circuitry comprising one or both of an encoder and a decoder may be implemented in a processor integrated circuit of a computer, a server, a mobile telephone, a storage device, or another type of processing device. A given such integrated circuit may be implemented using an ASIC, an FPGA or other processing component, as well as combinations of such components, and may be configured in the form of a system-on-chip (SOC).

BRIEF DESCRIPTION OF THE DRAWINGS

FIGS. 2, 3, 4 and 5 illustrate exemplary instruction traces for a sequential construct, a loop construct, an if-then-else construct, and a subroutine call/return construct, respectively.

DETAILED DESCRIPTION

Illustrative embodiments of the invention will be described herein with reference to exemplary processing devices, coding circuitry and associated encoding and decoding techniques based on program construct groups. It should be understood, however, that other embodiments can be implemented using a wide variety of other types and arrangements of processing devices, coding circuitry, and encoding and decoding techniques.

Figure 1:
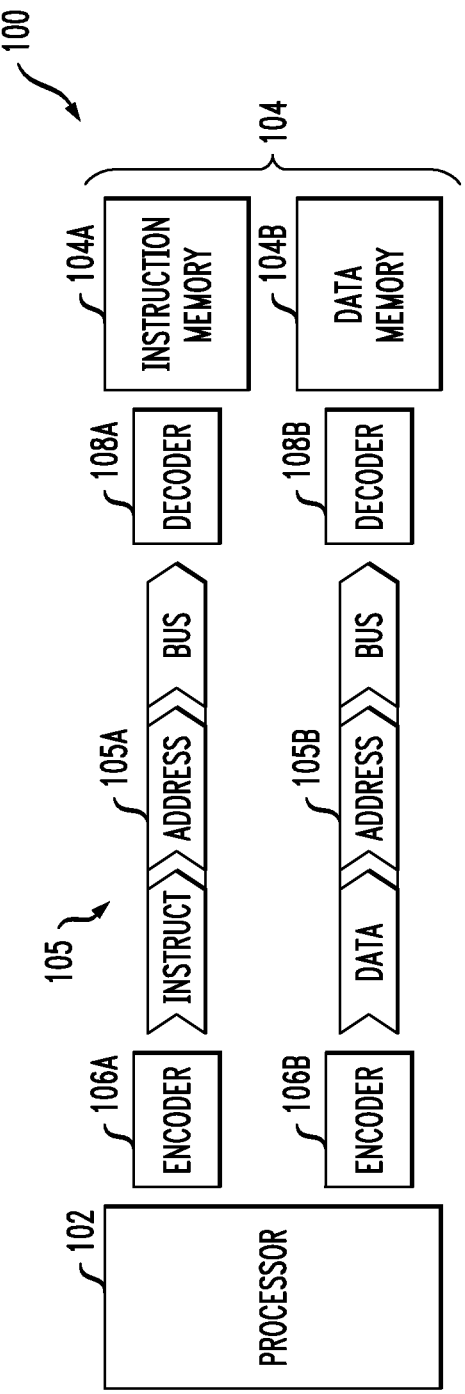
FIG. 1 is a block diagram of a processing device that incorporates instruction address encoding and decoding functionality using program construct groups in an illustrative embodiment.

FIG. 1 shows a processing device 100 comprising a processor 102 and a memory coupled to the processor 102 via a bus 105. The memory 104 more particularly comprises an instruction memory 104A and a data memory 104B, and the bus 105 more particularly comprises an instruction address bus 105A and a data address bus 105B. Each of the buses 105A and 105B has an associated encoder-decoder pair for encoding respective instruction or data addresses sent over that bus. Thus, encoder 106A encodes instruction addresses for transmission over bus 105A to decoder 108A, and encoder 106B encodes data addresses for transmission over bus 105B to decoder 108B. The decoders 108A and 108B are configured to decode the instruction and data addresses sent to them by the respective encoders 106A and 106B over the respective buses 105A and 105B.

The processor 102 and memory 104 in the FIG. 1 embodiment may comprise elements associated with an FPGA or an ASIC, or other type of processing device component, such as a central processing unit (CPU), an arithmetic logic unit (ALU), a digital signal processor (DSP), or other similar processing device component, as well as other types and arrangements of processing device circuitry, in any combination.

In the present embodiments, encoder 106A and decoder 108A are configured to implement respective instruction address encoding and decoding algorithms based on what are referred to herein as "program construct groups." Such a group comprises a group of instruction addresses that are associated with a particular distinct program construct, such as a sequential construct, a loop construct, an if-then-else construct, or a subroutine call/return construct. Examples of these program constructs will be described in greater detail below in conjunction with FIGS. 2, 3, 4 and 5.

It should be noted that certain of the encoding and decoding techniques disclosed herein with reference to instruction addresses may also be applied to other types of instructions, such as the data addresses transmitted over the data address bus 105B. For example, a single encoder may be used to encode both instruction addresses and data addresses for transmission over a common bus to a single decoder that decodes both types of addresses. Numerous other types and arrangements of encoders, decoders and buses may be used in other embodiments of the invention.

The encoder 106A in the present embodiment is illustratively configured to encode an instruction address for transmission over instruction address bus 105A by identifying the instruction address as belonging to a particular one of a plurality of groups of instruction addresses associated with respective distinct program constructs, and encoding the instruction address based on the identified group. The decoder 108A receives the encoded instruction address from the encoder 106A over the instruction address bus 105A, and decodes the encoded instruction address. The decoding process involves identifying the encoded instruction address as belonging to the particular one of the plurality of groups of instruction addresses associated with respective distinct program constructs, and decoding the encoded instruction address based on the identified group.

The encoded instruction address may include, for example, at least an identifier of the particular group, where the identifier of the particular group permits determination of one or more encoding parameters or other information associated with the particular group. The term "identifier" in this context is therefore intended to be broadly construed to encompass any type of information from which identity of a particular group can be inferred or otherwise determined. For example, the identifier in some embodiments may specify at least a distinct branch target address (BTA) associated with the program construct group. Such BTAs are used in encoding of instruction addresses in non-sequential construct groups. Instruction addresses in sequential construct groups may be encoded using a starting address and a stride parameter.

The processing device 100 may comprise a computer, a server, a mobile telephone, a storage device or any other type of device comprising a processor and a memory and in which instruction addresses are transmitted over a bus from the processor to the memory, such that signal transition activity on the bus can be reduced by encoding and decoding of the instruction addresses based on program construct groups as disclosed herein. As one more particular example, the processing device 100 may comprise a system-on-chip (SOC) integrated circuit in a hard disk drive (HDD) controller application, designed for reading and writing data from one or more magnetic storage disks of an HDD.

The encoder 106 and decoders 108 in the present embodiment may be viewed as collectively comprising an example of what is more generally referred to herein as "coding circuitry." The term "coding circuitry" as used herein is intended to be broadly construed, so as to encompass at least one of an encoder and a decoder, and may also encompass related portions of processor 102 or memory 104. For example, portions of the processor 102 or memory 104 that are utilized in performing operations relating to instruction address encoding or decoding as described herein may be considered part of the coding circuitry of a given processing device of system 100. Such coding circuitry may comprise a combination of an encoder and a decoder, also referred to as a codec, and may be implemented using hardware, software or firmware, in any combination. A given instance of "coding circuitry" as the term is broadly used herein may therefore encompass an encoder, a decoder or both, as in a codec configuration, or other similar coding devices, and possibly additional related signal processing circuitry, control circuitry or other circuitry.

The particular configuration of processing device 100 as shown in FIG. 1 is exemplary only, and the system 100 in other embodiments may include other elements in addition to or in place of those specifically shown, including one or more elements of a type commonly found in a conventional implementation of such a processing device.

As indicated above, at least a portion of an encoder 106 or decoder 108 may be implemented in the form of software that is stored in a memory and executed by a processor. A given such memory that stores software code for execution by a corresponding processor is an example of what is more generally referred to herein as a computer-readable medium or other type of computer program product having computer program code embodied therein, and may comprise, for example, electronic memory such as random access memory (RAM) or read-only memory (ROM), magnetic memory, optical memory, or other types of storage devices in any combination. The processor may comprise a microprocessor, CPU, ASIC, FPGA or other type of processing device, as well as portions or combinations of such devices.

It should also be appreciated that embodiments of the invention may be implemented in the form of integrated circuits. In a given such integrated circuit implementation, identical die are typically formed in a repeated pattern on a surface of a semiconductor wafer. Each die includes coding circuitry as described herein, and may include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

Encoding and decoding of instruction addresses based on program construct groups in respective encoder 106A and decoder 108A will now be described will now be described in greater detail with reference to FIGS. 2 through 15. The encoding operations in these illustrative embodiments may be viewed as compressing or compacting the instruction addresses in a manner that reduces the transition activity on the instruction address bus 105A, so as to reduce the overall power consumption of the processing device 100. It should be noted that reducing the transition activity on the instruction address bus 105A not only helps reduce the power consumption, but also helps improve signal integrity for addresses transmitted on the instruction address bus. One or more of these embodiments can be configured to provide substantial bus transition activity reduction and encoder-decoder power consumption reduction relative to conventional techniques such as WZE and DSE.

As mentioned previously, the encoding process involves associating instruction addresses with program construct groups, where a given program construct produces instruction addresses that can be generally characterized as sequential or non-sequential. By way of example, a given sequential address can be encoded based on a starting address and a stride parameter, and a given non-sequential instruction address can be encoded based on a corresponding BTA. The encoded instruction addresses are provided from the encoder to the decoder, possibly in combination with one or more sideband signals that are transmitted using one or more sideband signal channels that do not involve use of the bus 105A. Since only minimal information regarding the instruction address is transferred over the bus 105A in the illustrative embodiments, signal transition activity on that bus is greatly reduced.

The processor 102 as an initial step in program execution fetches instructions from respective instruction addresses of the instruction memory 104A. The instruction addresses are a function of the type of program construct. For example, if all instructions to be executed have no branching of any type, the sequence of instruction addresses follows an arithmetic progression, with the difference between any two consecutive addresses being referred to herein as a "stride." On the other hand, if branching occurs in an instruction, the instruction address would change from a certain value to a completely different value that is determined by branch address computation logic.

Embodiments of the present invention therefore recognize that during the course of program execution, the instruction addresses tend to have a mixture of sequential constructs and non-sequential constructs that have a certain degree of repetition. For example, such repetition can occur both in time (e.g., when certain program constructs repeat) and in space (e.g., for sequential execution, when instructions from consecutive locations are fetched).

As noted above, the encoder 106A takes an instruction address and encodes it for transmission over the bus 105A to decoder 108A. For simplicity of description, the instruction address and its corresponding encoded instruction address will also be referred to herein as an IA and an EIA, respectively. Additional control signals that may be sent in conjunction with the EIAs in certain embodiments are referred to herein as sideband signals, as previously mentioned. The sideband signals are used by the decoder in decoding the EIAs to recover the corresponding original IAs.

Such sideband signals in some embodiments may be viewed as providing information from which the identification of a particular program construct group for one or more EIAs can be inferred or otherwise determined. Accordingly, the encoder can communicate a program construct group identifier to the decoder using a combination of EIAs and sideband signals, and in numerous other ways. Also, a given EIA may be viewed as incorporating or otherwise providing an identifier of a program construct group, for example, in arrangements in which the program construct group can be inferred from previous addresses or other information communicated by the encoder.

Figure 2:
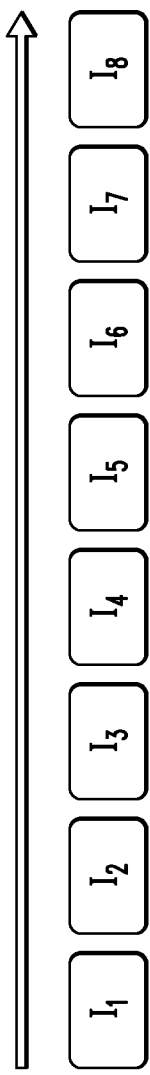

FIG. 2 illustrates an instruction trace for the case of a sequential construct. The term "instruction address trace" as used herein generally denotes the instruction addresses that are to be communicated from encoder to decoder over a certain period of time. The corresponding instructions are referred to as an "instruction trace."

Assuming for purposes of the present example that each instruction is 64 bits wide and that the instruction memory 104A uses 32-bit addressing, then the IAs for sequential execution would increment by 2 from each IA to the next IA. This constant value is an example of what is referred to herein as a stride. Stride values other than 2 can be used in embodiments of the invention, and those skilled in the art can readily determine an appropriate stride value for use with a particular instruction memory addressing.

The figure more particularly shows a sequence of instructions denoted $I_1$ though $I_8$, and adjacent instructions in this example will have addresses separated from one another by the stride of 2. In other words, if the instruction address associated with instruction $I_k$ is denoted $IA_k$, then $IA_{k+1} - IA_k = 2$, for k>0. The horizontal arrow in the figure indicates the progression of time from left to right, where for each time step one instruction is fetched in the present example. Although this example illustrates a single instruction fetch per cycle, the techniques can be adapted for multiple instruction fetches in parallel.

The encoder 106A in the present embodiment encodes a sequential construct of the type shown in FIG. 2 using a stride register. The stride register takes a previous instruction address and increments it by the stride value and then stores the result. When a new instruction address matches the contents of the stride register, the encoder recognizes that the current pattern of access is sequential. In this case, the EIA sent on the bus for the current IA is the same as the EIA sent on the bus for the prior IA. In other words, the value of the EIA is kept the same between the current IA and the previous IA. The decoder may include substantially the same set of registers as the encoder, including the above-noted stride register. When the decoder finds that the address on the bus has not changed, it infers that the current IA value is the previous value of IA plus the stride value.

Figure 5:
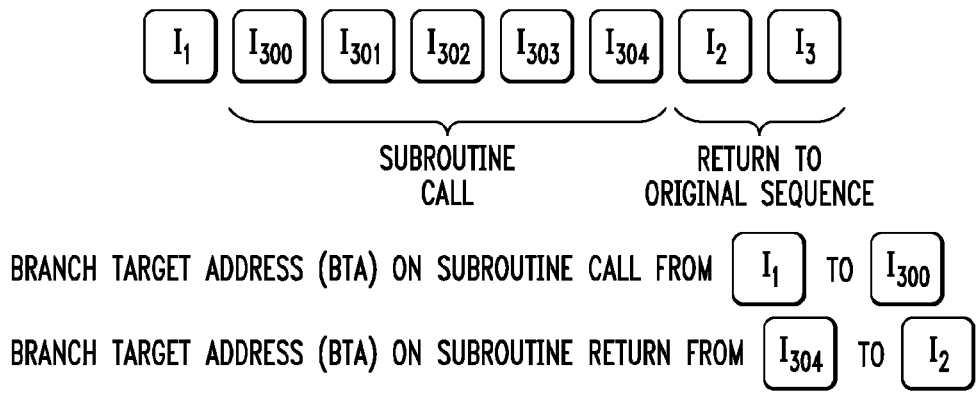

Examples of program constructs involving non-sequential execution are shown in FIGS. 3, 4 and 5. These figures illustrate a loop construct, an if-then-else construct, and a subroutine call/return construct, respectively. Each of these non-sequential constructs may have a distinct BTA.

Referring initially to FIG. 3, in this exemplary loop construct, the loop comprises a sequence of instructions $I_2$, $I_3$ and $I_4$ followed by a jump back to a particular BTA, in this case from instruction $I_4$ to instruction $I_2$.

In the if-then-else construct of FIG. 4, instructions $I_2$, $I_3$ and $I_4$ are executed if the designated condition is true and instructions $I_5$, $I_6$ and $I_7$ are executed if the designated condition is false. The BTA when the condition is true is from instruction $I_8$ to instruction $I_4$ and the BTA when the condition is false is from instruction $I_5$ to instruction $I_1$.

In the subroutine call/return construct of FIG. 5, the instruction execution includes a subroutine call that involves branching to a subroutine at address $I_{300}$ from instruction $I_1$. The subroutine includes instruction $I_{300}$ as well as additional instructions $I_{301}$, $I_{302}$, $I_{303}$ and $I_{304}$. After these instructions are completed, the execution returns from the subroutine to instruction $I_2$, which is the next instruction in the sequence. Accordingly, the BTA on the subroutine call is from instruction $I_1$ to instruction $I_{300}$ and the BTA on the subroutine return is from instruction $I_{304}$ to instruction $I_2$. It should be noted that this example is simplified to include a subroutine with sequential execution, but in practice the subroutine may include any combination of sequential and non-sequential constructs.

Figure 6:
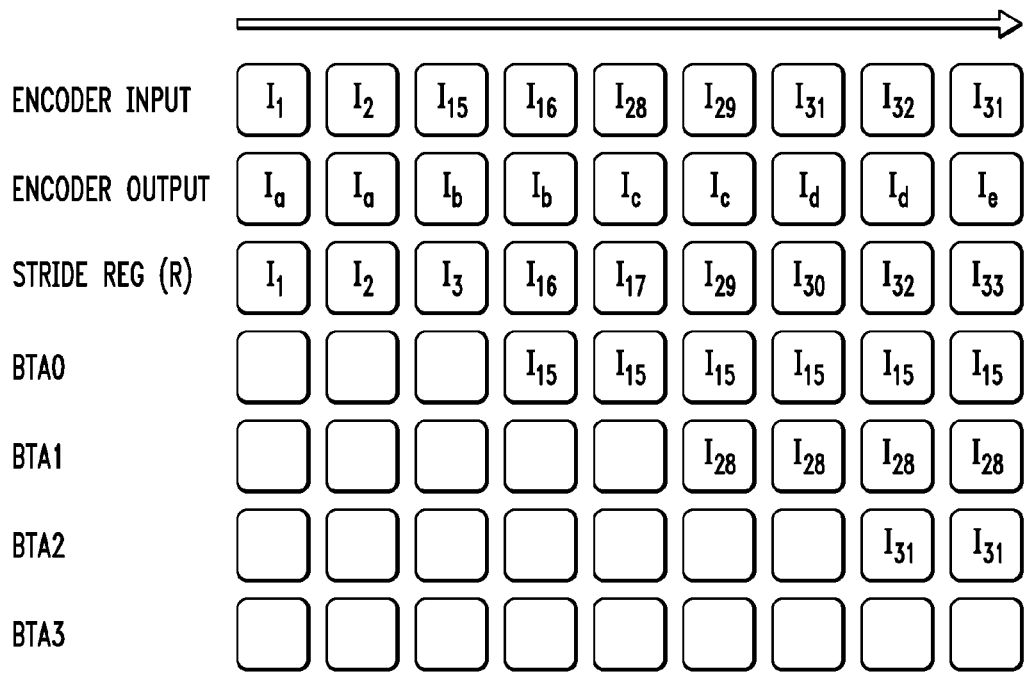
FIG. 6 shows the operation of an encoder of the FIG. 1 processing device in an illustrative embodiment in which the encoder comprises a stride register and four branch target address registers.

FIG. 6 illustrates the operation of the encoder 106A in encoding instruction addresses for non-sequential constructs. The encoder 106A in this embodiment is assumed to include a stride register denoted R and four BTA registers denoted BTA0, BTA1, BTA2 and BTA3. The instruction trace at the encoder input comprises the instructions $I_1$, $I_2$, $I_{15}$, $I_{16}$, $I_{28}$, $I_{29}$, $I_{31}$, $I_{32}$ and $I_{31}$. This exemplary trace includes non-sequential constructs with BTAs of $I_{15}$, $I_{28}$ and $I_{31}$, respectively, with the BTA registers BTA0, BTA1 and BTA2 being used to track these BTAs during program execution.

In operation, the encoding process illustrated in FIG. 6 compares a current IA with the value stored in the stride register R. If a mismatch occurs, the encoder infers that the current IA is associated with a non-sequential construct. It then compares this IA with the values in the BTA registers BTA0, BTA1, BTA2 and BTA3 in that order. If the current IA does not match the content of any of the BTA registers, the encoder 106A stores the current IA in one of the BTAs. The particular algorithm that is used to decide which BTA register should hold this new BTA can be adapted based on application specific needs. In the FIG. 6 embodiment, the BTA register is chosen using a round robin algorithm. Accordingly, when the first BTA $I_{15}$ arrives, it is stored in BTA0, the next BTA $I_{28}$ is stored in BTA1, the next BTA $I_{31}$ is stored in BTA2, and so on.

The encoder 106A generates an EIA for a corresponding IA associated with a non-sequential construct in the following manner. When the BTA occurs for the first time, the IA itself is sent as the EIA. In addition, a sideband signal indicating that this is the first occurrence of the corresponding BTA is sent with the EIA. Thus, in the FIG. 6 embodiment, for the case of instruction $I_{15}$, the encoder output is denoted $I_b$, where $I_b=I_{15},1$. The value 1 indicates that this new address is a new BTA. This information is used by the decoder 108A to keep track of the EIAs that arrive from the encoder 106A over the instruction address bus 105A. The decoder stores this new BTA in its BTA0 register. For every new BTA that occurs on the instruction address bus 105A for the first time, the next available BTA register is used to store this value.

In the event that five new BTAs were to occur in the FIG. 6 embodiment, the first four will be stored in BTA0, BTA1, BTA2 and BTA3, respectively. The fifth new BTA will be stored back in BTA0, essentially losing track of the first BTA that occurred. Accordingly, if the first BTA were to recur after the fifth BTA, it would be treated as a new BTA and stored in BTA2. As a result, it is apparent that there is a tradeoff between resource allocation and performance in selecting the number of BTA registers and the manner in which BTAs are replaced in these registers.

When the current IA is a BTA that has previously occurred and has been stored in one of the BTA registers, comparison of the current IA with that BTA register will signal a match. In this case, the EIA can be transmitted by the encoder using only a single bit of the instruction address bus 105A. For example, if there are 32 bit lines in the bus, then four of these lines can be mapped to respective ones of the BTA registers BTA0, BTA1, BTA2 and BTA3. The BTAs stored in these registers may be viewed as respective examples of distinct program constructs as that term is broadly used herein. A group of multiple instruction addresses may therefore be associated with each such distinct program construct.

The encoder 106A determining if a current IA is a BTA stored in one of the BTA registers may be viewed as in effect identifying the IA as belonging to a particular one of a plurality of groups of instruction addresses associated with respective distinct program constructs, and encoding the IA based on the identified group. It is to be appreciated, however, that other techniques for encoding an IA based on program construct groups may be used in other embodiments.

Returning to the above example in which if there are 32 bit lines in the bus 105A, and four of these lines are mapped to respective ones of the BTA registers BTA0, BTA1, BTA2 and BTA3, if the current IA matches the BTA stored in register BTA0, bit line 0 of the bus can be changed in value while the rest of the bit line values are kept the same. In addition, a sideband signal line can be toggled to indicate that the bus is now carrying an EIA indicating which BTA has recurred. For the 32-bit bus in this example, recurrence information for up to 32 different BTAs can be encoded. Additional BTA information can be accommodated using additional sideband signal lines.

As indicated previously, the decoder 108A includes the same set of registers as the encoder 106A, and thus in the present embodiment includes the stride register R as well as the BTA registers BTA0, BTA1, BTA2 and BTA3. The decoder examines each EIA as it arrives over the bus 105A from the encoder. When a current EIA value is changed relative to the EIA value in the previous cycle, the decoder infers that either a new BTA has occurred or a previous BTA has recurred. Based on the associated sideband signal, the decoder can determine if the current EIA indicates that a BTA has recurred. For example, if the BTA stored in register BTA0 at the encoder has recurred, bit line 0 of bus 105A would have changed in the current EIA relative to the previous cycle. The decoder can therefore infer that the BTA stored in its register BTA0 is the current IA.

In this manner, the decoder identifies the EIA as belonging to a particular one of the plurality of groups of instruction addresses associated with respective distinct program constructs, and decodes the encoded instruction address based on the identified group. Again, in the present embodiment, each different BTA is assumed to represent a distinct program construct.

After decoding the current EIA received over the bus 105A to obtain the current IA in the manner described above, the decoder 108A updates its stride register to store the sum of the value of the current IA and the current stride value, in expectation of sequential execution following the current IA.

The FIG. 6 embodiment is considerably simplified for purposes of illustration, and in practice program segments may include millions of instructions. The above-noted tradeoff between resource allocation and performance therefore becomes particularly important. As mentioned above, this involves selecting the particular number of BTA registers to be used in a given embodiment and the particular manner in which BTAs are replaced in these registers. If a sufficiently large number of BTA registers is available, each unique BTA can be tracked without it ever being overwritten by a new BTA. On the other hand, if fewer BTA registers are allocated, the registers will be frequently overwritten. For example, if a program segment has 1000 BTAs and only 50 BTA registers are allocated, then the BTA registers will clearly be overwritten multiple times.

In some embodiments, the BTA registers of the encoder 106A and the decoder 108A may be arranged in multiple stages, with a threshold used to determine if particular BTAs are stored in an initial stage or advanced to a subsequent stage. Such an arrangement of BTA registers is an example of what is more generally referred to herein as a multi-stage memory bank, and may be implemented in substantially the same manner in both encoder 106A and decoder 108A. Upon an initial occurrence of a given BTA, that BTA is initially placed in a first stage of the multi-stage memory bank. The BTA is advanced to a subsequent stage of the multi-stage memory bank if that BTA occurs a threshold number of times in the particular program segment being processed. As will be described in more detail below, the threshold in certain embodiments may be selected to have a value greater than two, although other thresholds and multi-stage memory bank arrangements may be used in other embodiments. For example, the multi-stage memory bank may include more than two stages, with different thresholds used to determine advancement from stage to stage.

In an embodiment in which the multi-stage memory bank includes two stages, the first stage of the multi-stage memory bank may be configured to store at least two BTAs, and the subsequent stage may be configured to store a number of BTAs that is given by a bus width in bits less the number of BTAs that can be stored by the first stage. Thus, in the previous example in which the bus width was given as 32 bits, if first stage is configured to include two BTA registers, the second stage would include 30 BTA registers.

The use of a multi-stage arrangement of BTA registers of the type described above can help to remove BTAs that have short repeat lengths, thereby allowing the encoder to focus on BTAs that occur more frequently. More generally, it allows the encoder to achieve improved instruction address tracking capability with fewer registers than would otherwise be required without use of such an arrangement.

Experimental simulations have indicated that limiting the number of BTA registers in the first stage of the multi-stage memory bank can generally provide improved performance for typical program segments relative to arrangements without multiple stages or arrangements with a large number of registers in the first stage. For example, embodiments in which there are two registers in the first stage provide significant performance improvements relative to conventional practice while also limiting the total number of registers required across all stages. Of course, parameters such as the number of BTA registers in each stage, the number of stages and the occurrence thresholds used to advance a BTA from stage to stage may vary depending upon the types of programs being executed in the processing device 100.

With regard to the threshold for advancing a BTA from the first stage to a subsequent stage, it was indicated above that thresholds having values of two or more may be used. However, the threshold in other embodiments may be selected to have a value of one. In such an embodiment, a single recurrence of a given BTA will result in the given BTA being moved from a BTA register of the first stage to a BTA register of the subsequent stage. This type of arrangement can simplify the encoder and decoder circuitry.

Embodiments of the encoder 106A and decoder 108A will now be described in greater detail with reference to FIGS. 7 through 15. These arrangements may be viewed as examples of what is more generally referred to herein as "coder circuitry." It is to be appreciated that other arrangements of coder circuitry may be used to implement encoding and decoding based on program construct groups as disclosed herein.

In these embodiments, it is assumed without limitation that the instruction address bus is 32 bits wide, and that the encoder 106A and decoder 108A each include 32 BTA registers, with the BTA registers being arranged in the form of a multi-stage memory bank with two BTA registers in the first stage and 30 BTA registers in the second stage. The BTA registers are denoted BTA0 through BTA31. The threshold number of hits for advancement of a given BTA from one of the first stage registers BTA0 or BTA1 to one of the second stage registers BTA2 through BTA31 is three hits, although as indicated previously other threshold values may be used to control advancement of a given BTA from one stage to another. The encoder 106A and decoder 108A each also include a stride register R.

Figure 7:
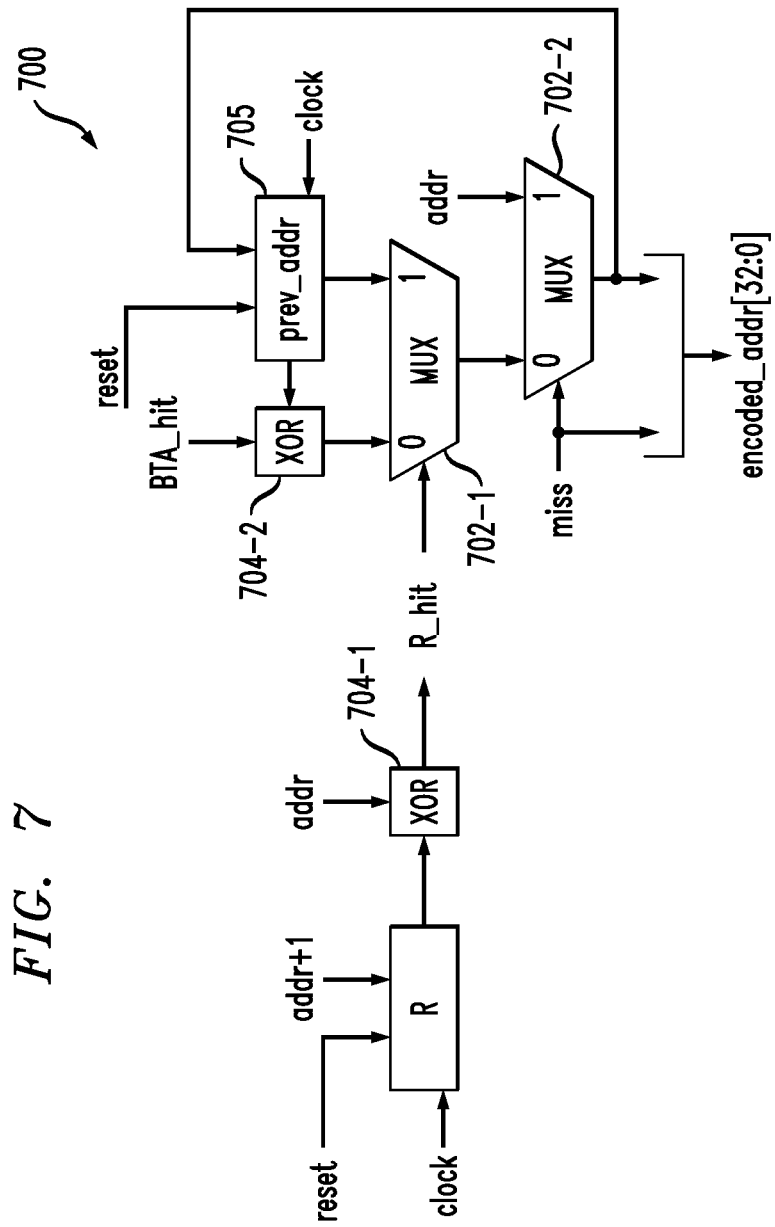
FIGS. 7, 8 and 9 illustrate circuitry for address generation, hit generation and miss generation, respectively, in the encoder of the FIG. 1 processing device.
Figure 8:
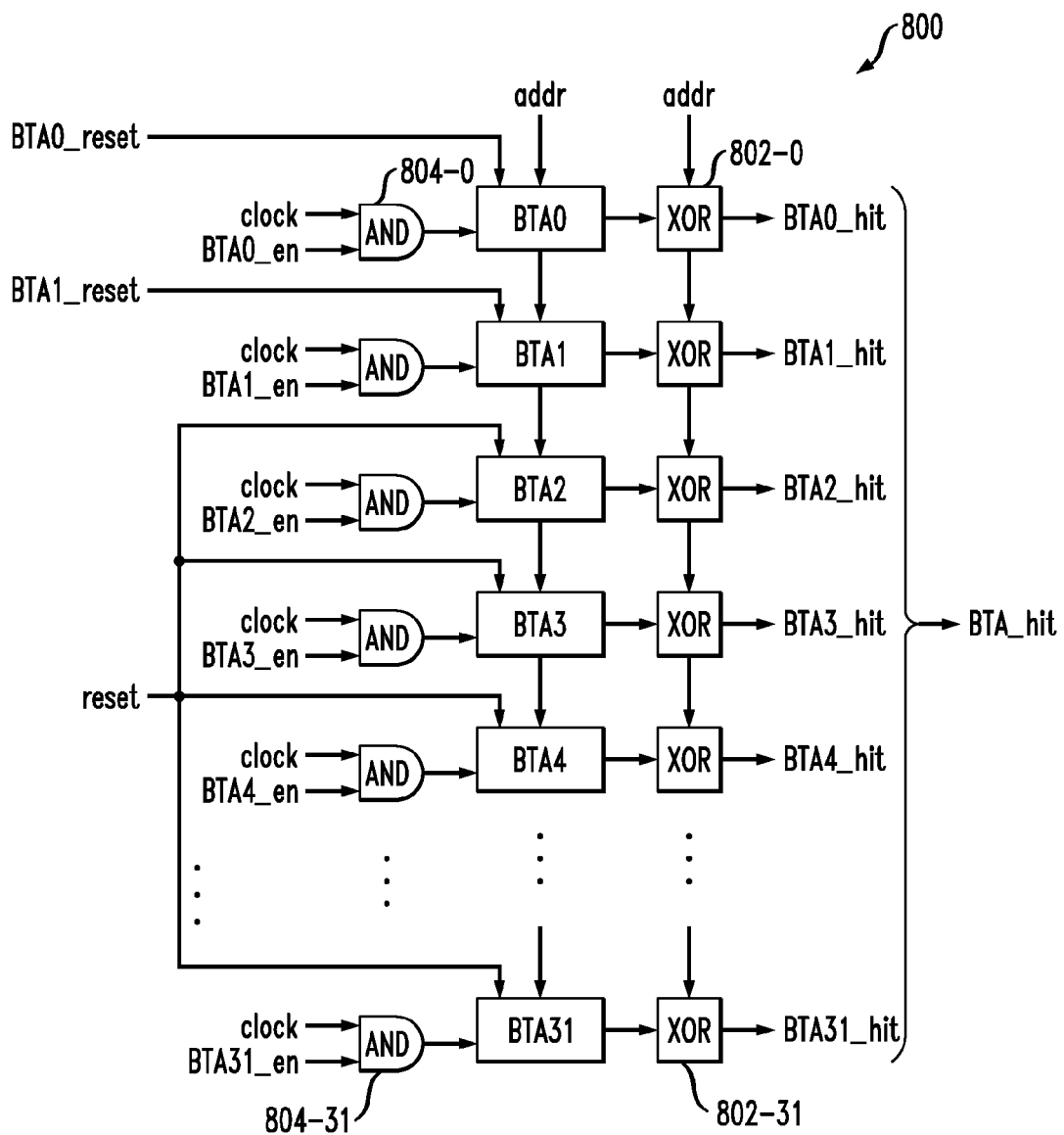
Figure 9:
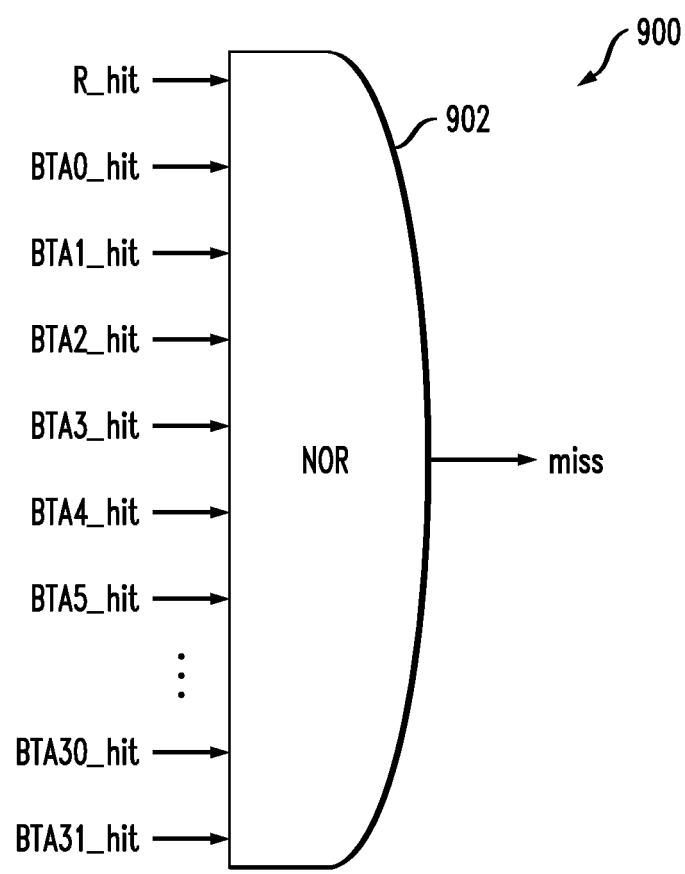

FIGS. 7, 8 and 9 illustrate circuitry that is implemented in the encoder 106A of the processing device 100.

Referring initially to FIG. 7, a portion 700 of the encoder 106A is shown. This portion includes the stride register R, multiplexers 702-1 and 702-2, exclusive-or (XOR) gates 704-1 and 704-2, and a previous address register 705. The stride register R has clock and reset inputs, and a control input denoted addr+L The addr+1 input when asserted causes the stride register to perform an addition function modulo $2^{32}$, where as noted above 32 is the width in bits of the instruction address bus 105A. It should be noted in this regard that performance of addition modulo 32 is automatically accomplished by using the lower 32 bits of an addition result and discarding any higher bit positions. Accordingly, no additional circuitry is required to perform the addition function modulo 32.

The XOR gate 704-1 receives as one input the current contents of the R register and as its other input the current 32-bit instruction address which is denoted addr. It generates an output R_hit which indicates whether or not there is match between the current address and the address predicted by the stride register R.

The XOR gate 704-1 in the present embodiment is assumed to be implemented as a modified XOR gate that takes as its inputs two 32-bit operands, computes the bit-by-bit XOR of the two operands, and reduces the result to a single bit using a NOR operation. Thus, for example, if two identical operands A[31:0] and B[31:0] are input to a modified XOR gate of this type, the bit-by-bit XOR operation will produce a string of 32 zeros, and the reduction will NOR all of the zeros to output a one.

The previous address stored in register 705 is also a 32-bit instruction address and is denoted prev_addr. It corresponds to the previous instruction address communicated by the encoder to the decoder. The XOR gate 704-2 receives as its two inputs a signal denoted BTA_hit and the prev_addr value stored in the register 705.

The multiplexer 702-1 selects between the output of the XOR gate 704-2 and the prev_addr value stored in register 705, responsive to the R_hit signal from XOR gate 704-1. The multiplexer 702-2 selects between the output of multiplexer 702-1 and the current address addr responsive to a miss signal.

The multiplexers 702 are therefore configured to select either the previous address from register 705, the previous address XOR'ed with the BTA_hit signal, or the current address. The previous address from register 705 is selected by the multiplexers 702 in the event of a hit in the stride register R indicating sequential execution. The previous address XOR'ed with the BTA_hit signal is selected to indicate a hit to a specific BTA register. The current address is selected if that address is neither a match for the next sequential address as predicted by the stride register R nor a hit to any BTA register. This scenario in which the current address is selected by the multiplexers is also referred to as a miss and is indicated by the miss signal applied to a control input of the multiplexer 702-2.

The BTA_hit signal in the present embodiment may be viewed as being formed by the concatenation of 32 1-bit signals denoted BTA0_hit, BTA1_hit, BTA2_hit, . . . BTA31_hit. These 32-bit signals indicate the presence or absence of a hit between the current address and the respective BTAs stored in the respective BTA registers. Thus, for example, the logic level of the BTA0_hit signal indicates whether or not the current address matches the contents of the BTA0 register. Accordingly, a logic high level in a given one of these 1-bit signals indicates that the BTA stored in the corresponding BTA register has been repeated in the current address.

As illustrated in FIG. 8, the BTA_hit signal is generated utilizing a portion 800 of encoder 106A. The portion 800 shown in the figure includes the BTA registers BTA0 through BTA31, and corresponding respective XOR gates 802-0 through 802-31. The XOR gates 802-0 through 802-31 generate at their respective outputs the 1-bit signals BTA0_hit, BTA1_hit, BTA2_hit, . . . BTA31_hit. These XOR gates 802 are assumed to be modified XOR gates of the type described above in the context of XOR gate 704-1 used to generate the 1-bit R_hit signal. Each XOR gate 802 receives as one of its inputs the current address and as its other input the value stored in the corresponding BTA register.

As mentioned previously, BTA registers BTA0 and BTA1 are assumed to provide a first stage of a multi-stage memory bank, and the remaining BTA registers are assumed to provide a second stage of the multi-stage memory bank.

Also, as noted above, each of the modified XOR gates 802 may incorporate a NOR gate so as to allow the modified XOR gate to produce a 1-bit output from the result of a bit-by-bit XOR applied to two 32-bit input operands. Thus, each bit of a given 32-bit XOR result produced in one of the XOR gates 802 can be applied to a corresponding input of its associated NOR gate, with the output of the NOR gate providing a 1-bit output that is at a logic high level if the current address matches the stored BTA and is otherwise at a logic low level. These 1-bit outputs from the XOR gates 802 correspond to the respective signals BTA0_hit, BTA1_hit, BTA2_hit, . . . BTA31_hit, which collectively comprise the 32-bit BTA_hit signal applied to an input of XOR gate 704-2 in FIG. 7.

The coding circuitry arrangement illustrated in FIG. 8 further includes AND gates 804-0 through 804-31 associated with the respective BTA registers BTA0 through BTA31. Each of the AND gates receives as one of its inputs a clock signal and as its other input a corresponding one of a plurality of enable signals denoted BTA0_en through BTA31_en. When a given one of the enable signals is active, the current address is stored into the corresponding BTA register. It should be noted that only one of the enable signals BTA0_en through BTA31_en is active on each clock cycle, and thus only one of the BTA registers can store the current address in each clock cycle.

The reset signals are used to reset the BTA registers to known states. The BTA0_reset and BTA1_reset signals are unique to the resetting of the respective BTA0 and BTA1 registers in the first stage of the multi-stage memory bank. A given one of these is reset when the specified threshold is reached for its stored BTA, in which case the BTA is advanced to a second stage BTA register. In conjunction with this advancement, the duplicate entry in the first stage BTA register is cleared using the reset.

FIG. 9 shows a portion 900 of the encoder 106A that is used to generate the miss signal referred to in the context of FIG. 7. The portion 900 includes a NOR gate 902 that receives as its inputs the R_hit signal and the BTA0_hit through BTA31_hit signals. The miss signal is at a logic high level when there is no hit between the current address and the contents of the stride register R or any of the BTA registers BTA0 through BTA31.

Figure 10:
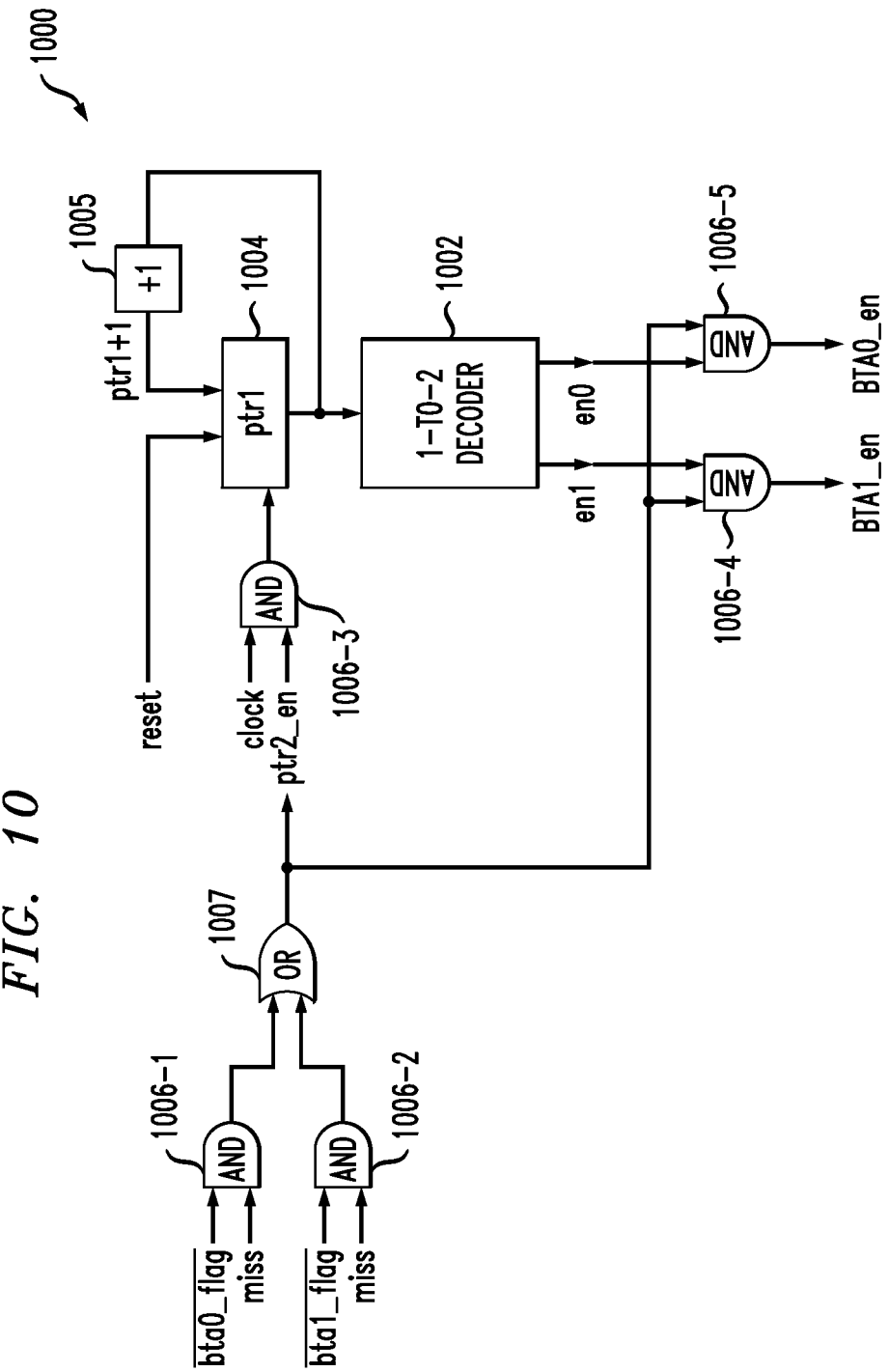
FIGS. 10, 11 and 12 illustrate circuitry that is implemented in both the encoder and the decoder of the FIG. 1 processing device.
Figure 11:
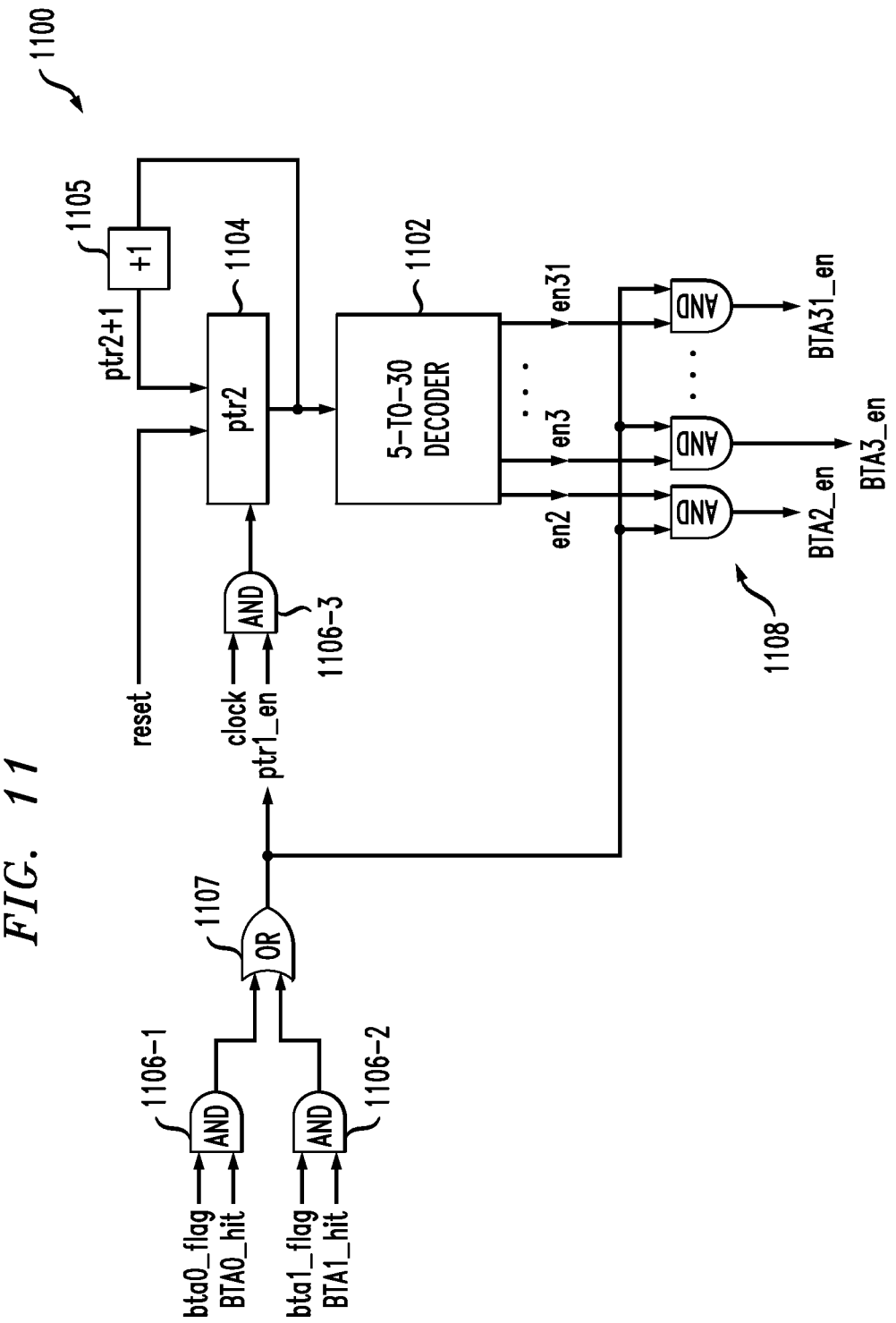
Figure 12:
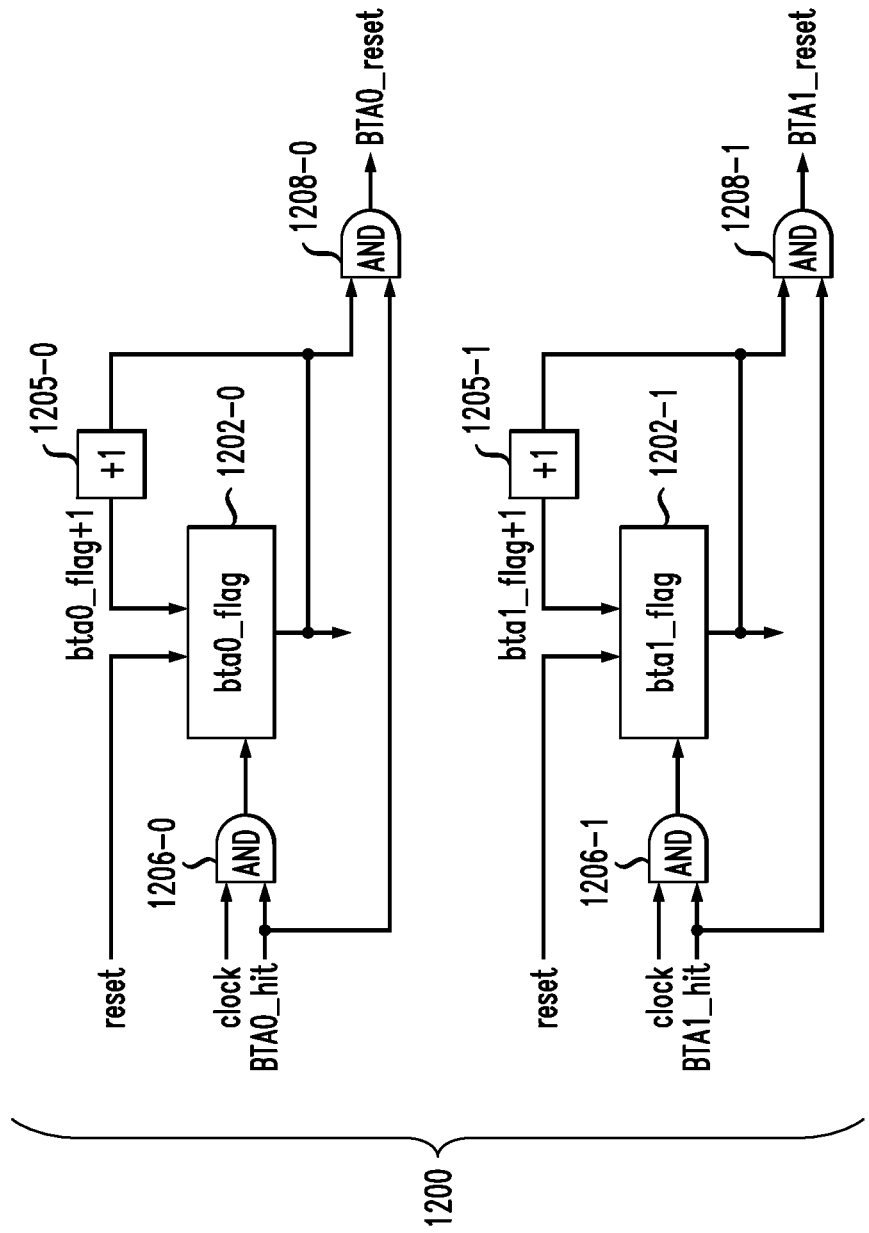

FIGS. 10, 11 and 12 show circuitry portions 1000, 1100 and 1200, respectively, that are implemented in both encoder 106A and decoder 108A.

Referring initially to FIG. 10, portion 1000 of encoder 106A and decoder 108A comprises a 1-to-2 decoder 1002, a pointer register 1004, a pointer increment element 1005, AND gates 1006-1 through 1006-5, and an OR gate 1007. The outputs of the AND gates 1006-4 and 1006-5 provide the respective enable signals BTA1_en and BTA0_en used to enable the BTA1 and BTA0 registers. These are the first stage BTA registers of the multi-stage memory bank. The pointer register 1004 stores a pointer denoted ptr1 that is a pointer to the next first stage BTA register that should be replaced on a miss. More particularly, every time there is a miss, the least recently used first stage BTA register is pointed to by the pointer ptr1. One of the BTA1_en and BTA0_en signals is asserted depending on which of the two first stage registers is next in line to be updated. Thus, the pointer ptr1 serves to identify the particular first stage BTA register that will be updated in the case of a miss between a current address and the contents of the first stage BTA registers.

The AND gates 1006-1 and 1006-2 each receive as inputs the miss signal and a corresponding flag signal. The flag signals received by these respective gates are the complements of respective flag signals denoted bta0_flag and bta1_flag. The outputs of the two AND gates 1006 are applied as inputs to OR gate 1007, which generates a signal denoted ptr2_en that is applied as an input to each of the AND gates 1006-3, 1006-4 and 1006-5. The 1-to-2 decoder 1002 generates outputs en1 and en0 that are applied as inputs to the respective AND gates 1006-4 and 1006-5.

As shown in FIG. 11, portion 1100 of encoder 106A and decoder 108A comprises a 5-to-30 decoder 1102, a pointer register 1104, a pointer increment element 1105, AND gates 1106-1, 1106-2, 1106-3 and 1108, and an OR gate 1107. The outputs of the AND gates 1008 provide the respective enable signals BTA2_en through BTA31_en used to enable the BTA2 through BTA31 registers. These are the second stage BTA registers of the multi-stage memory bank. The pointer register 1104 stores a pointer denoted ptr2 that is a pointer to the next second stage BTA register that should be replaced when a given BTA has met the threshold number of hits in BTA0 or BTA1 for advancement to a second stage BTA register. More particularly, every time there is BTA to be advanced from the first stage to the second stage, the least recently used second stage BTA register is pointed to by the pointer ptr2. One of the BTA2_en through BTA031_en signals is asserted depending on which of these thirty second stage registers is next in line to be updated. Thus, the pointer ptr2 serves to identify the particular second stage BTA register that will be updated in the case of that the threshold number of hits is met.

The AND gates 1106-1 and 1106-2 each receive as inputs the miss signal and a corresponding flag signal. The flag signals received by these respective gates are the uncomplemented flag signals bta0_flag and bta1_flag. The outputs of the two AND gates 1106 are applied as inputs to OR gate 1107, which generates a signal denoted ptr1_en that is applied as an input to each of the AND gates 1108. The 5-to-30 decoder 1102 generates outputs en2 through en31 that are applied as inputs to the respective AND gates 1108.

In the FIG. 11 circuitry, the pointer ptr2 tracks the utilization of the second stage BTA registers BTA2 through BTA31. As noted above, these registers are updated when the threshold three hits occur on one of the first stage registers BTA0 or BTA1. When this occurs, the BTA address is moved from either BTA0 or BTA1 to the second stage BTA register pointed to by ptr2. The 5-to-30 decoder 1102 takes a 5-bit signal as input and generates a 30-bit output, where only the particular output bit line corresponding to the decimal value of the 5-bit input is active. For example, if ptr2 is 00100, then the fourth output bit line of the decoder 1102 is at a logic high level and the rest of the 30 output bit lines are all at a logic low level.

As indicated above, the pointers ptr1 and ptr2 are used to control utilization of the first stage and second stage BTA registers, respectively. Because the first stage in the present embodiment includes two BTA registers, the pointer ptr1 may be implemented as a 1-bit counter counting from 0 through 1 and back to 0. The second stage has 30 BTA registers, and therefore the pointer ptr2 may be implemented as a 5-bit counter that counts from 0 through 29 and then resets back to 0. However, in order to facilitate the encoding of counter values and the associated multiplexer select functions, the pointer ptr2 is instead implemented as a 5-bit counter that counts from 2 through 31 and then resets back to 2. It should be noted that other types of counters may be used, including Galois counters, for example.

Referring now to the circuitry 1200 of FIG. 12, the manner in which the BTA0_reset and BTA1_reset signals are generated is shown. These signals are generated using respective flag registers 1202-0 and 1202-1, increment elements 1205-0 and 1205-1, input AND gates 1206-0 and 1206-1, and output AND gates 1208-0 and 1208-1. The flag registers 1202-0 and 1202-1 store respective flag values bta0_flag and bta1_flag that count the number of hits to the respective BTA0 and BTA1 registers, such that when the threshold number of hits is reached, and the corresponding BTA is moved from BTA0 or BTA1 to one of the second stage BTA registers, BTA0 or BTA1 can be updated.

Figure 13:
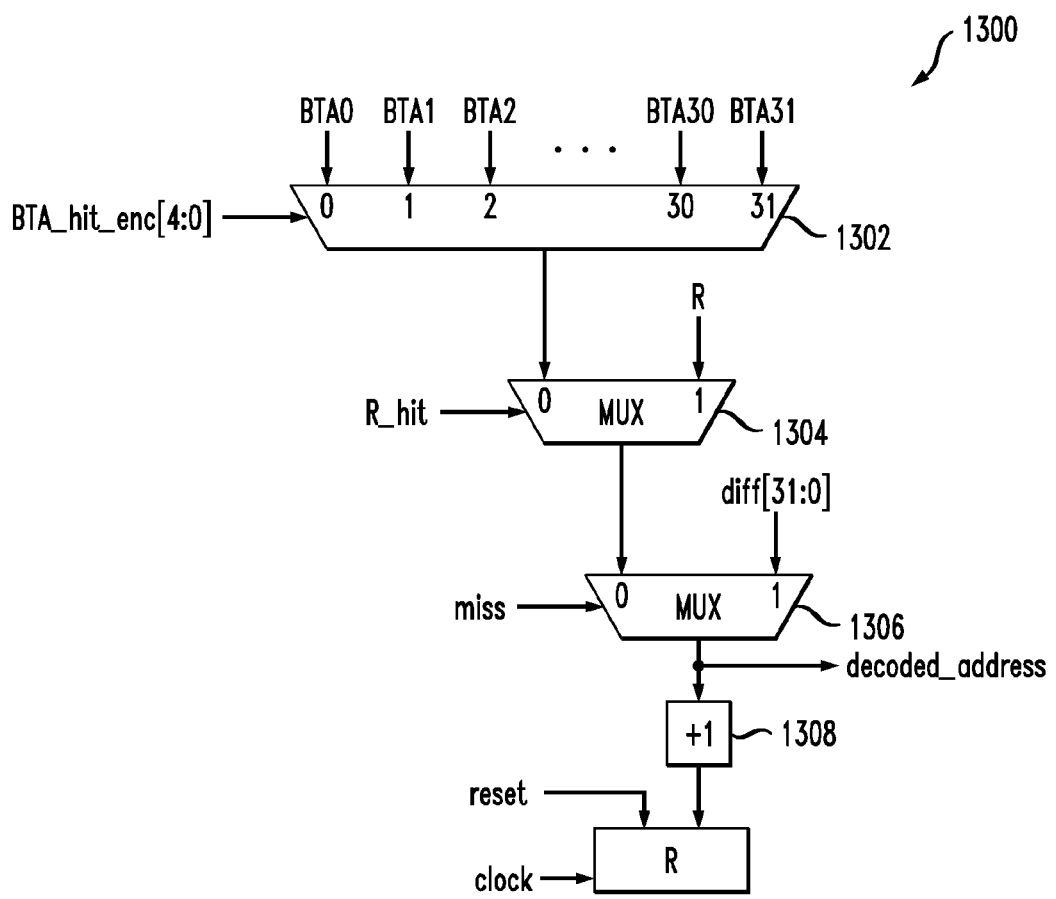
FIGS. 13 and 14 illustrate circuitry for address generation and hit generation, respectively, in the decoder of the FIG. 1 processing device.
Figure 14:
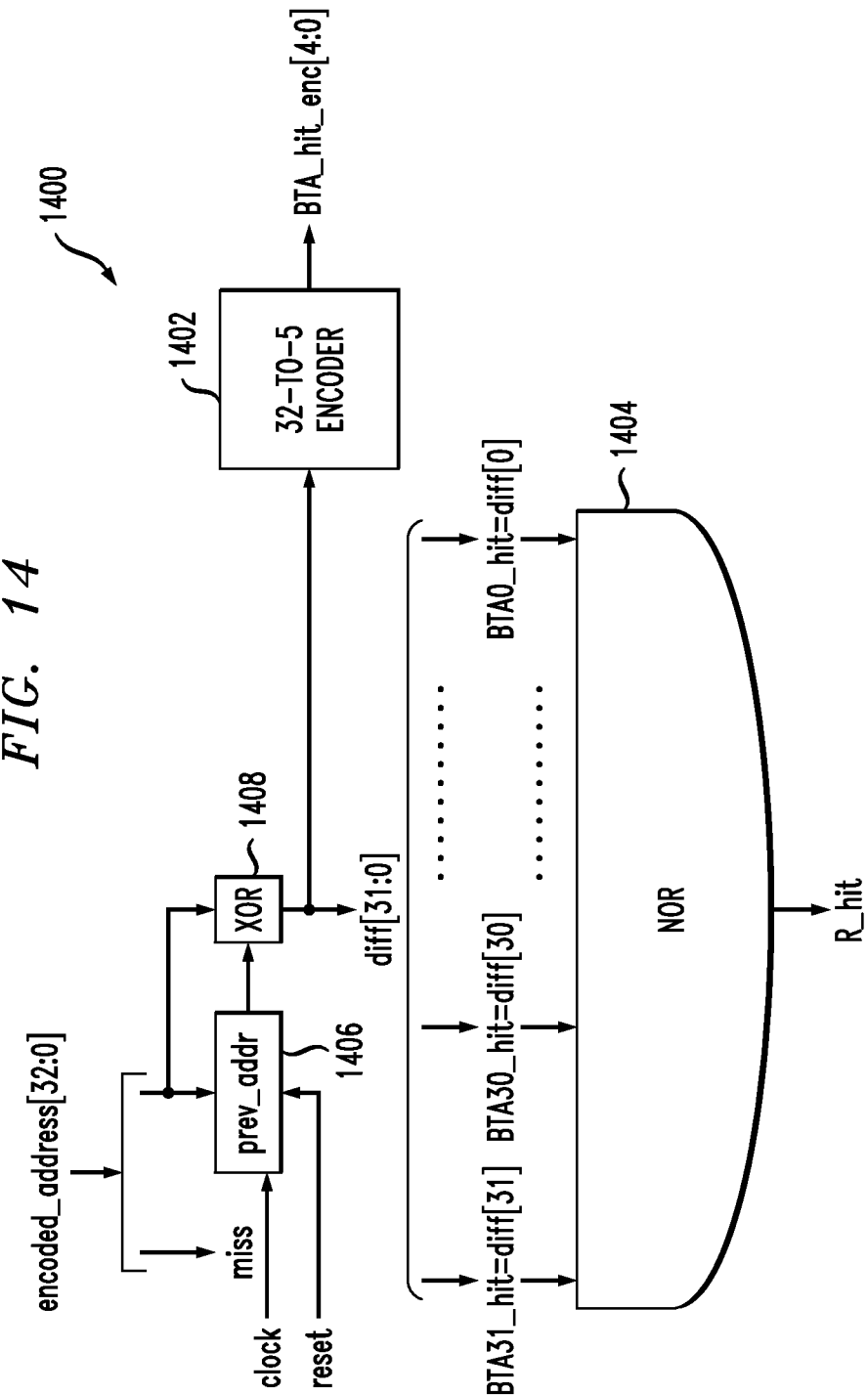
Figure 15:
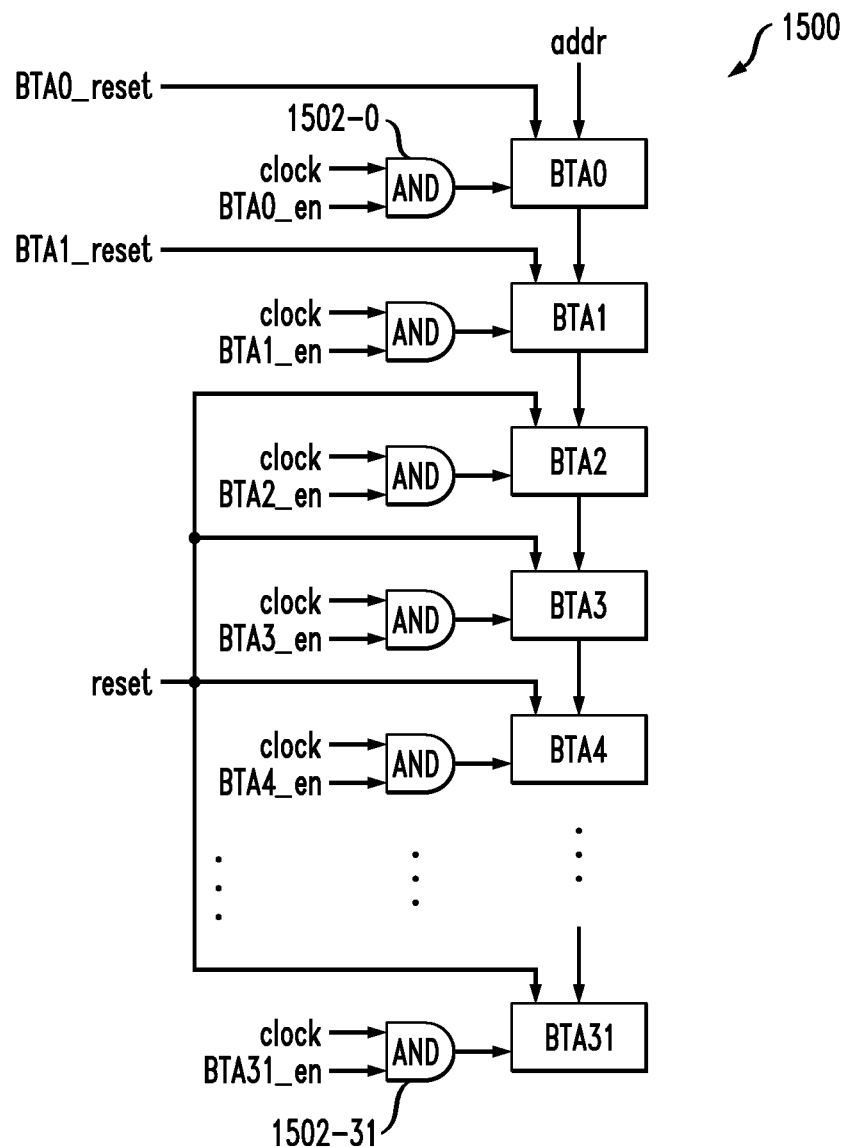
FIG. 15 illustrates additional circuitry of the decoder of the FIG. 1 processing device.

FIGS. 13, 14 and 15 illustrate circuitry that is implemented in the decoder 108A of the processing device 100.

With reference to FIG. 13, portion 1300 of decoder 108A comprises three multiplexers 1302, 1304 and 1306, an increment element 1308, and the stride register R. The first multiplexer 1302 selects contents of a particular one of the 32 BTA registers BTA0 through BTA31, responsive to a 5-bit control signal denoted BTA_hit_enc[4:0]. The contents of the selected BTA register are applied to one of the inputs of the second multiplexer 1304, which selects between those contents and the contents of the stride register R responsive to the R_hit signal. The output of the second multiplexer 1304 is applied as one input to the third multiplexer 1306, which selects between that input and another input signal diff[31:0] responsive to the miss signal. The output of the third multiplexer 1306 is the decoded instruction address, denoted decoded_address in the figure. This decoded instruction address is incremented in increment element 1308 and stored in the stride register R. Thus, in the FIG. 13 circuitry 1300, the BTA hits extracted from the received EIA are used both to generate the decoded address and to update the stride register R.

In FIG. 14, a portion 1400 of the decoder 108A includes a 32-to-5 encoder 1402, NOR gate 1404, previous address register 1406, and XOR gate 1408. This portion of the decoder generates the diff[31:0] and BTA_hit_enc[4:0] signals utilized in FIG. 13, based on BTA hits extracted from the received EIA. The 32-to-5 encoder 1402 takes in 32 1-bit values corresponding to hits in respective BTA registers BTA0 through BTA31 and encodes them into the 5-bit control signal BTA_hit_enc[4:0]. More particularly, the 32-to-5 encoder uses active low input, such that, for example, if bit 4 of the 32-bit encoder input is a logic low level, the 5-bit output of the encoder is 00100. Also shown in FIG. 14 is the generation of the R_hit signal that identifies a sequential address pattern in progress. The XOR gate 1408 in this figure is unique in that it performs only the XOR function without the output NOR reduction previously described in conjunction with FIG. 8.

FIG. 15 shows a portion 1500 of decoder 108A that includes the two-stage memory bank comprising first stage BTA registers BTA0 and BTA1 and second stage BTA registers BTA2 through BTA31. Updating of these registers is controlled by outputs of respective AND gates 1502-0 through 1502-31, each of which receives as its inputs a clock signal and one of the enable signals BTA0_en through BTA31_en. This circuitry arrangement is substantially the same as that previously described for the encoder in the context of FIG. 8, with the exception of the BTA hit signal generation. This is because the BTA hits are readily extracted in the decoder from the EIA as noted above.

It is to be appreciated that the particular circuitry arrangements illustrated in FIGS. 7 through 15 are presented by way of illustrative example only, and numerous other types and arrangements of logic gates and other circuit elements may be used to implement embodiments of the invention. For example, variations may be made in the bus width, the number of stages in the multi-stage memory bank and the number of BTA registers in each stage, the total number of BTA registers, the threshold for advancing a BTA from one stage to the next stage, the types of counters used, and numerous other parameters. Also, in the embodiments of FIGS. 7 through 15, a round robin type of selection technique is used to select which of the BTA registers should store a given new BTA, but a wide variety of other BTA register selection techniques may be used.

Examples of pseudocode algorithms for the encoding and decoding processes implemented by respective encoder 106A and decoder 108A in an illustrative embodiment are shown in Appendices 1 and 2 below. Like the circuitry of FIGS. 7 to 15, the pseudocode algorithms of Appendices 1 and 2 are presented by way of example only, solely for purposes of illustrating the operation of exemplary embodiments of the invention. These and other embodiments disclosed herein should not be construed as limiting in any way. The encoding and decoding techniques represented by the pseudocode algorithms may be implemented at least in part in the form of software within the processing device 100.

In the circuitry and pseudocode embodiments noted above, program construct groups are used to provide highly efficient encoding and decoding of instruction addresses. For example, the dual-stage BTA register configuration selectively filters out unnecessary branch target address and only keeps those that repeat more often, even if they repeat over varying time intervals. The bus transition activity is substantially reduced, leading to lower power consumption in the processing device. Additionally, signal integrity is improved for instruction addresses transmitted in encoded form over an instruction address bus. Moreover, the latency of the encoder is very low compared to conventional encoders, making it particularly well-suited for use in high-speed applications.

In other embodiments, the disclosed instruction address encoding and decoding techniques can be applied to other types of processors, including multi-threaded processors with multiplexed instruction and data buses. Also, as indicated previously, these techniques can be adapted for use with data address buses, or applied to both instruction and data address buses in a processing device such as processing device 100. In such an arrangement, separate multi-stage memory banks and associated advancement thresholds may be used for the instruction addresses and the data addresses. Alternatively, conventional encoding and decoding can be used for the data addresses, while the program construct group based techniques disclosed herein are applied only to the instruction addresses.

Again, it should be emphasized that the embodiments of the invention as described herein are intended to be illustrative only. For example, other embodiments of the invention can be implemented using a wide variety of other types of processing devices, coding circuitry and associated encoding and decoding algorithms, than those included in the embodiments described herein. These and numerous other alternative embodiments within the scope of the following claims will be readily apparent to those skilled in the art.

APPENDIX 1

Pseudocode Algorithm for Encoder

```
Encoder(input: addr)
Initialization Sequence (Once when system reset is asserted)
ptr1= 0; // ptr-1 cycles between 0 and 1
ptr2=2; // ptr-2 cycles from 2 through 31
miss = 0;
bta0_flag = 0;
bta1_flag = 0;
R = 1;
Running Sequence (Repeated until system reset is asserted)
if (addr == R)
index = prev index;
EIA = prev addr;
R = addr + stride;
elseif (addr == BTA[2]) ]) // Group-2 BTA2 hit
EIA = (prev addr XOR 2^2); // 2^2 is 2 raised to the power of 2.
R = addr + stride;
elseif (addr == BTA[3]) ]) // Group-2 BTA3 hit
EIA = (prev addr XOR 2^3); // 2^3 2 raised to the power of 3.
R = addr + stride;
,,,,,,,
elseif (addr == BTA[31]) ]) // Group-2 BTA31 hit
EIA = (prev addr XOR 2^31); // 2^31 is 2 raised to the power of 31.
R = addr + stride;
elseif ((bta0_flag == 0) && (addr == BTA[0]) // BTA0 occurs for
```

APPENDIX 1-continued

Pseudocode Algorithm for Encoder

```
second time
{
EIA = (prev addr XOR 2^0); // 2^0 is 2 raised to the power of 0.
LSB is flipped
bta0_flag = 1;
R = addr + stride;
}
elseif ((bta1_flag == 0) && (addr == BTA[1]) // BTA1 occurs for
second time
{
EIA = (prev addr XOR 2^1); // 2^1 is 2 raised to the power of 1.
bta0_flag = 1;
R = addr + stride;
}
elseif ((bta0_flag == 1) && (addr == BTA[0]) // BTA0 occurs for
third time
}
EIA = (prev addr XOR 2^0); // 2^0 is 2 raised to the power of 0.
LSB is flipped
bta0_flag = 0;
BTA[ptr2] = BTA[ptr1];
BTA[ptr1] = 0;
ptr1 = 0; // BTA0 location has been vacated and can be reused
ptr2 = (ptr2-2) mod32 + 2;
R = addr + stride;
}
elseif ((bta1_flag == 1) && (addr == BTA[1]) // BTA0 occurs for
third time
{
EIA =(prev addr XOR 2^1); // 2^1 is 2 raised to the power of 1.
bta1_flag = 0;
BTA[ptr2] = BTA ptr1];
BTA[pt1] = 0;
ptr = 1; // BTA1 location has been vacated and can be reused
ptr2 = (ptr2-2) mod32 + 2;
R = addr + stride;
}
else // Instruction Address is a new BTA
{
EIA = addr;
if (ptr1 == 0)
bta0_flag = 0;
else
bta1_flag = 0;
BTA[ptr1] = addr;
ptr1 = ptr1 xor 1;
R = addr + stride;
miss = 1;
}
```

APPENDIX 2

Pseudocode Algorithm for Decoder

```
Decoder(input: EIA and SBS comprising miss)
Initialization Sequence (Once when system reset is asserted)
ptr1= 0; // ptr-1 cycles between 0 and 1
ptr2=2; // ptr-2 cycles from 2 through 31
miss = 0;
bta0_flag = 0;
bta1_flag = 0;
R = 1;
Running Sequence (Repeated until system reset is asserted)
XOR EIA with previous value of EIA. Call this DIFF.
If (miss == 0) && (DIFF == 0) // Hit has occurred and address is
sequential
addr = R;
R = R + stride;
elseif (miss == 0) && (DIFF == 2^0) && (bta0_flag == 0)// BTA0
second occurrence
addr = BTA[0];
R = BTA[0]+stride;
bta0_flag = 1;
elseif (miss == 0) && (DIFF == 2^1) && (bta1_flag == 0)// BTA1
second occurrence
```

APPENDIX 2-continued

Pseudocode Algorithm for Decoder

```
Addr = BTA[1];
R = BTA[1]+stride;
bta0_flag = 1;
elseif (miss == 0) && (DIFF == 2^0) && (bta0_flag == 1)// BTA0 third occurrence
addr = BTA[0];
R = BTA[0]+stride;
bta0_flag = 0;
BTA[ptr2] = BTA[0];
ptr1 = 0; // BTA0 location has been vacated and can be reused
ptr2 = (ptr2-2) mod32 + 2;
BTA[0] = 0;
else if (miss == 0) && (DIFF == 2^1) && (bta0_flag == 1)// BTA1 third occurrence
addr = BTA[1];
R = BTA[1]+stride;
bta1_flag = 0;
BTA[ptr2] = BTA[1];
ptr1 = 1; // BTA1 location has been vacated and can be reused
ptr2 = (ptr2-2) mod32 + 2;
BTA[1] = 0;
else if (miss == 0) && (DIFF == 2^2)// Group-2 BTA0 occurrence
Addr = BTA[2];
R = BTA[2]+stride;
else if (miss == 0) && (DIFF == 2^3)// Group-2 BTA1 occurrence
Addr = BTA[3];
R = BTA[3]+stride;
,,,,,,,
else if (miss == 0) && (DIFF == 2^31)// Group-2 BTA31 occurrence
addr = BTA[31];
R = BTA[31]+stride;
else // MISS = 1
{
if (ptr1 == 0)
bta0_flag = 0;
else
bta1_flag = 0;
BTA[ptr1] = EIA;
ptr1 = ptr1 xor 1;
addr = EIA;
R = addr + stride
}
```

What is claimed is:

1. A method comprising:
obtaining an instruction address; and
encoding the instruction address;
wherein said encoding comprises:
identifying the instruction address as belonging to a particular one of a plurality of groups of instruction addresses associated with respective distinct program constructs, wherein identifying the instruction address as belonging to the particular one of the plurality of groups of instruction addresses associated with the respective distinct program constructs further comprises classifying the instruction address as being one of a sequential address and a non-sequential address; and
encoding the instruction address based on the identified group, wherein encoding the instruction address based on the identified group comprises, for a given instruction address classified as a non-sequential address, storing a corresponding branch target address in a multi-stage memory bank in which the branch target address is initially placed in a first stage of the multi-stage memory bank upon an initial occurrence of the branch target address and the branch target address is advanced to a subsequent stage of the multi-stage memory bank if the branch target address occurs a threshold number of times.

2. The method of claim 1 further comprising transmitting the encoded instruction address over a bus to a decoder.

3. The method of claim 1 wherein the encoded instruction address includes at least an identifier of the particular group.

4. The method of claim 3 wherein the identifier of the particular group specifies the corresponding branch target address.

5. The method of claim 1 wherein the distinct program constructs comprise two or more of a sequential construct, a loop construct, an if-then-else construct, and a subroutine call/return construct.

6. The method of claim 1 wherein a given one of the groups is associated with a sequential construct having a starting address and a stride parameter.

7. The method of claim 1 wherein a given one of the groups is associated with a non-sequential construct having a particular branch target address.

8. The method of claim 7 wherein each of at least a subset of the plurality of groups has a distinct branch target address.

9. The method of claim 1 wherein encoding the instruction address based on the identified group further comprises generating one or more sideband signals separate from the encoded instruction address.

10. The method of claim 1 wherein the threshold is greater than two.

11. The method of claim 1 wherein the first stage is configured to store at least two branch target addresses, and the subsequent stage is configured to store a number of branch target addresses that is given by a bus width in bits less the number of branch target addresses that can be stored by the first stage.

12. A computer program product comprising a non-transitory computer-readable storage medium having computer program code embodied therein, wherein the computer program code when executed by a processing device causes the processing device to perform the steps of the method of claim 1.

13. An apparatus comprising:
coding circuitry comprising an encoder configured to encode a non-sequential instruction address for transmission to a decoder;
wherein the encoder is operative to identify the non-sequential instruction address as belonging to a particular non-sequential construct group of a plurality of groups of instruction addresses associated with respective distinct non-sequential program constructs, and to encode the non-sequential instruction address based on the identified non-sequential group.

14. An integrated circuit comprising the apparatus of claim 13.

15. The apparatus of claim 13 wherein the encoder is implemented as at least one circuit.

16. A method comprising:
obtaining an encoded non-sequential instruction address; and
decoding the encoded non-sequential instruction address;
wherein said decoding comprises:
identifying the encoded non-sequential instruction address as belonging to a particular non-sequential construct group of a plurality of groups of instruction addresses associated with respective distinct non-sequential program constructs; and
decoding the encoded non-sequential instruction address based on the identified non-sequential construct group.

17. A computer program product comprising a non-transitory computer-readable storage medium having computer program code embodied therein, wherein the computer program code when executed by a processing device causes the processing device to perform the steps of the method of claim 16.

18. An apparatus comprising:
coding circuitry comprising a decoder configured to decode an encoded non-sequential instruction address received from an encoder;
wherein the decoder is operative to identify the encoded non-sequential instruction address as belonging to a particular non-sequential construct group of a plurality of groups of instruction addresses associated with respective distinct non-sequential program constructs, and to decode the encoded non-sequential instruction address based on the identified non-sequential construct group.

19. The apparatus of claim 18 wherein the decoder is implemented as at least one circuit and the encoder is implemented as at least one circuit.

20. A processing device comprising:
a processor;
a memory coupled to the processor via a bus;
an encoder coupled between the processor and the bus, the encoder being implemented as at least one circuit; and
a decoder coupled between the bus and the memory, the decoder being implemented as at least one circuit;
the encoder being configured to encode a non-sequential instruction address from the processor for transmission to the decoder over the bus;
the decoder being configured to decode an encoded non-sequential instruction address received from the encoder over the bus;
wherein the encoder is operative to identify the non-sequential instruction address as belonging to a particular non-sequential construct group of a plurality of groups of instruction addresses associated with respective distinct non-sequential program constructs, and to encode the non-sequential instruction address based on the identified non-sequential group; and
wherein the decoder is operative to identify the encoded non-sequential instruction address as belonging to the particular non-sequential construct group of the plurality of groups of instruction addresses associated with respective distinct program constructs, and to decode the encoded non-sequential instruction address based on the identified non-sequential construct group.

\* \* \* \* \*